United States Patent [19]

Dart

[11] 4,440,206
[45] Apr. 3, 1984

[54] UNIVERSAL HAMMER HAVING INTERCHANGEABLE HEADS

[76] Inventor: John R. Dart, 998 Racine Ave., Columbus, Ohio 43204

[21] Appl. No.: 474,154

[22] Filed: Mar. 10, 1983

[51] Int. Cl.³ .............................................. B25C 1/00
[52] U.S. Cl. .................................. 145/29 R; 145/2 R; 145/36; 403/318; 403/324
[58] Field of Search .................. 145/2 R, 3, 29 R, 36; 403/324, 320, 318

[56] References Cited

U.S. PATENT DOCUMENTS

| 129,164 | 7/1872 | Pearce | 145/29 R |
|---|---|---|---|
| 235,244 | 12/1880 | Howe | 145/36 |
| 318,981 | 6/1885 | Green | 145/29 R |
| 495,607 | 4/1893 | Barney | 145/36 |
| 1,111,277 | 9/1914 | Trainor | 145/2 R |
| 2,501,757 | 3/1950 | Cagle | 145/3 |
| 2,837,381 | 6/1958 | Sarlandt | 145/29 R |
| 3,385,334 | 5/1968 | Clay | 145/36 |

FOREIGN PATENT DOCUMENTS

| 1351886 | 12/1963 | France | 145/29 R |
|---|---|---|---|
| 922680 | 4/1963 | United Kingdom | 145/29 R |

*Primary Examiner*—Frederick R. Schmidt
*Assistant Examiner*—J. T. Zatarga
*Attorney, Agent, or Firm*—Frank H. Foster

[57] ABSTRACT

A universal hammer having separable handle and head portions to permit the use of interchangeable heads. The head is formed with a female threaded bore which threadedly engages a male threaded shank. A cross hole is formed through both the head and the shank so that a pin may be inserted to retain the separable parts against relative rotation. A collar is also threaded to the shank and has a cylindrical portion which surrounds the cross bore to prevent removal or loss of the pin. A locking nut jams against the collar to prevent it from becoming loose.

6 Claims, 11 Drawing Figures

UNIVERSAL HAMMER HAVING INTERCHANGEABLE HEADS

FIELD OF THE INVENTION

This invention relates to hand-held tools and more particularly relates to a hammer type instrument having interchangeable heads for securing cost and space saving advantages and more particularly relates to structure for connecting the heads to the handle so that they are strongly secured together in a safe and reliable manner yet allows the heads to be easily interchanged.

BACKGROUND OF THE INVENTION

Hammers are tools which come in a broad variety of types, shapes and sizes, each ordinarily having its own special purpose and advantage. From time to time most people experience the need to use different hammers for different applications.

Conventionally, this requires the purchase of different hammers each at considerable expense. However, both expense and space can be minimized by purchase of a hammer having detachable handle and head portions so that only those heads which an owner may use need to be purchased. This allows an owner to custom select those heads particularly suited to his own needs and thereby build his own set without requiring duplication of the handle. These can be stored in a small container taking up less space than an equal number of complete hammers. Additionally, any breakage or damage which occurs to a hammer requires only replacement of the damaged part and not the purchase of an entirely new hammer.

Many others have suggested designs for detachable hammer heads or hammer faces. These are shown, for example, in U.S. Pat. Nos. 634,016; 724,268; 2,938,412; and 3,234,981.

However, it is desirable that separable hammers having interchangeable heads exhibit two characteristics. First is the ease and speed with which one head may be replaced with another. Second is the reliable security with which the head is mounted to the handle. It is desirable that the head be able to be easily and quickly removed when such removing is desired by the user and easily and quickly replaced by another and yet not come loose during its use when such removal is not intended.

Separable hammer units which are merely threadedly engaged together are subject to the unintentional and undesired detachment resulting from vibrations set up in the hammer during use. The threadedly engaged parts may back out or unscrew due to those vibrations and blows. Additionally, such separable hammer units often require that one threaded portion be tightly jammed against the other since they rely solely on this tight jamming to maintain a secure connection.

It is therefore an object of the present invention to provide an improved hammer of the type having relatively detachable handle and head portions in order to permit the interchange of the head with another head.

Another object of the invention is to provide such a hammer in which its separable parts are reliably secured by positive locking and yet are easily and rapidly separable when desired.

Yet another object of the present invention is to provide a hammer of the separable type to permit a savings of costs and storage space where storage space is at a premium such as in many apartments or in automobiles.

A further object of the invention is to provide such a hammer which offers a variety of hammer heads in a manner which is portable and of light weight and less size than otherwise obtainable.

BRIEF SUMMARY OF THE INVENTION

A hammer in accordance with the present invention has relatively detachable handle and head portions to permit interchange of the head with other heads. Each head has a bore formed as a part of a coupling means to receive a handle and has a cross hole formed transversely through the bore. The handle has a shank formed as a mating coupling means to extend into and engage the bore so that the head and the handle are connected. The handle also has a cross hole formed transversely through the shank and the cross hole of the handle is positioned in alignment with the cross hole of the head when the two are engaged. A pin extends through the cross hole and a collar is removably attached around the cross hole to prevent the pin from being removed from the cross holes.

Figure 1:
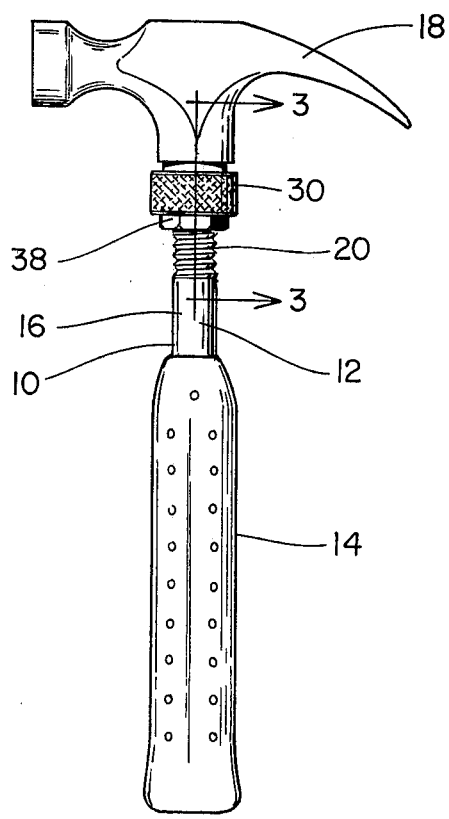
FIG. 1 is a view in side elevation of a preferred embodiment of the invention fully assembled.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

Figure 2:
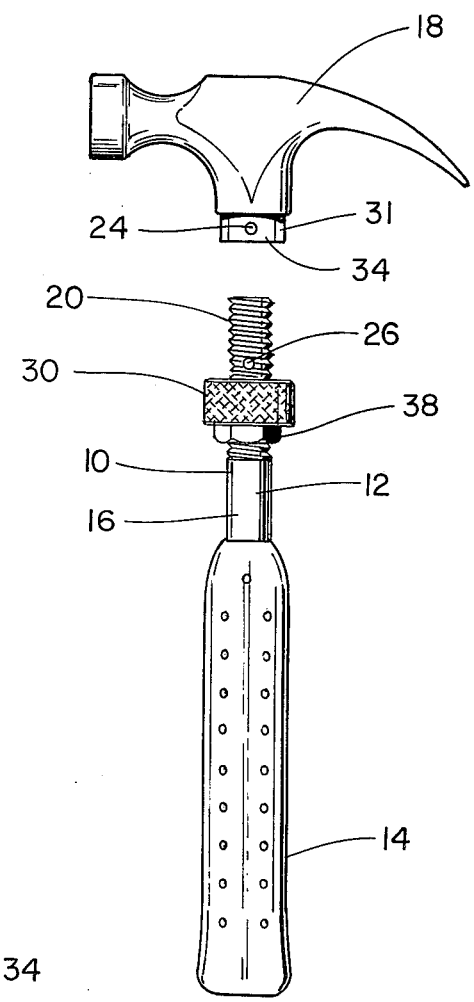
FIG. 2 is a view in side elevation of the embodiment of FIG. 1 with the head removed from the handle.
Figure 2A:
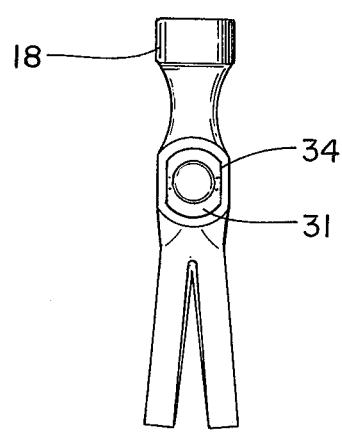
FIG. 2A is a bottom view of the head 18 of FIG. 2.

FIGS. 1 and 2 illustrate a hammer 10 embodying the present invention. The hammer has a handle 12 which includes both a hand grip 14 and a shank 16. A hammer head 18 is detachable from the handle 12. In the preferred embodiment, the handle is attached to the head 18 by a coupling means in the form of conventional screw threads 20.

Figure 4:
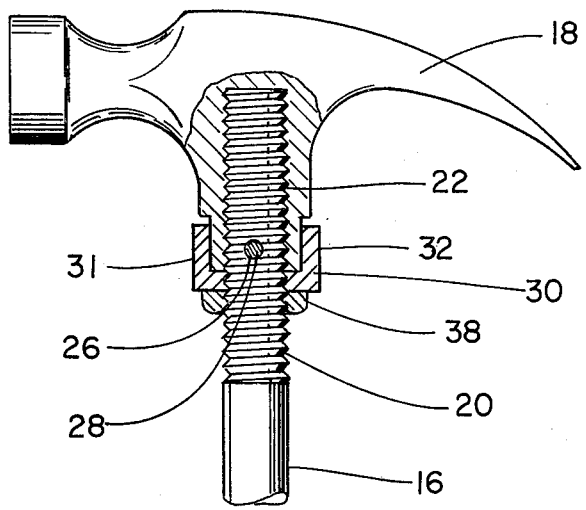
FIG. 4 is a view partly in vertical section taken substantially along the line 4—4 of FIG. 3.
Figure 3:
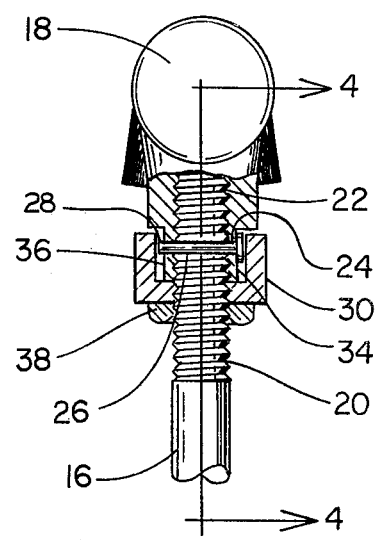
FIG. 3 is a view in side elevation partly in vertical section taken substantially along the line 3—3 of FIG. 1.

As more clearly visible in FIGS. 3 and 4, the male threads 20 formed on the end of the shank 16 extend into mating female threads 22 in a bore drilled or otherwise formed into the hammer head 18. A cross hole 24 is formed transversely through the threaded bore 22. A similar cross hole 26 is formed transversely through the threaded portion of the shank. The cross holes are positioned so that when the head 18 is in its desired position in threaded engagement on the shank 16, the cross holes 24 and 26 are in alignment.

A pin 28 extends through the cross holes 24 and 26 to retain the threadedly engaged shank and head against relative rotation which could cause the head to be unscrewed from the shank.

A collar 30 is also threadedly engaged to the shank 16 so that, after the pin 28 is inserted, the collar may be rotated to surround the cross holes and thereby prevent withdrawal of the pin.

Preferably, the lower end of the head 18 is formed at the end of the female threads into a circular boss which extends coaxially with the threaded bore 22 toward the shank or handle portion 12. The cross hole 24 is formed through this circular boss and the collar 30 is formed with an annular tube portion 32 having an inside diameter only sufficiently greater than the outside diameter of the boss 31 to provide sufficient clearance to allow the collar to be manually rotated and screwed until it surrounds the cross holes 24 and 26. Desirably, the length of the pin is only enough shorter than the inside diameter of the collar to also permit clearance.

The boss 31 is advantageously provided with flattened surfaces 34 and 36 on its peripheral surface around each end of the cross hole 24. This allows room between the flattened surface and the interior wall of the collar 30 for the head 36 of the pin 28 on one side of the boss. It also allows the pin to extend from the boss at the other flat surface so that during disassembly the pin may be easily pushed with the finger part way out of the cross hole so that it may be easily grasped at the head for simple removal.

A locking nut 38 may be threadedly engaged to the male threaded shank 20 so that it may be jammed against the collar 30 to prevent it from backing off and becoming removed from its position holding the pin within the transverse holes.

During use of a hammer embodying the invention, the head cannot become unintentionally detached from the shank because the pin 28 prevents rotation of the shank relative to the head and therefore prevents one part of the hammer from becoming unscrewed from the other. Furthermore, the pin 28 is prevented from being removed from the cross hole 24 and 26 by the collar 30. Additionally, even if the pin 28 were to break during use, the head 18 would still be restrained against rotation relative to the shank 16 by the pin.

Figure 8:
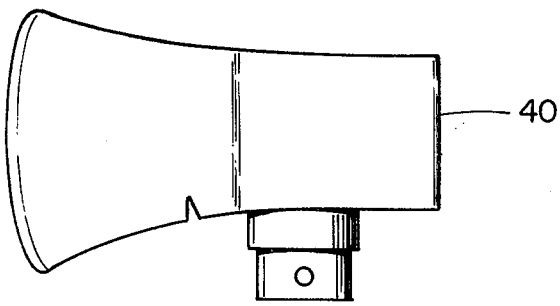
FIGS. 8 and 9 are views in side elevation of alternative hammer heads for use in the preferred embodiment of the invention.
Figure 5:
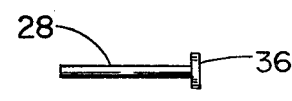
FIG. 5 is a view in perspective of the pin used in the preferred embodiment of the invention.
Figure 6:
FIG. 6 is a view in perspective and vertical section of a collar utilized in the preferred embodiment of the invention.
Figure 9:
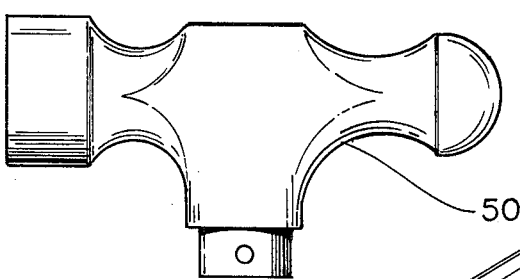
Figure 7:
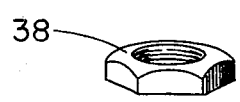
FIG. 7 is a top plan view of a locking nut utilized in the preferred embodiment of the invention.
Figure 10:
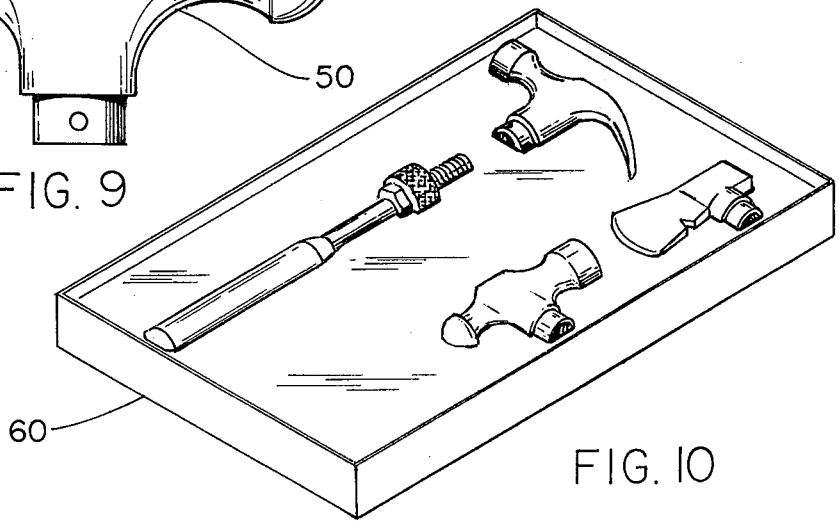
FIG. 10 is a view in perspective of a hammer head kit embodying the present invention.

An owner of a hammer constructed in accordance with the invention is able to obtain a variety of heads, such as the hatchet head 40 illustrated in FIG. 8 or the ball peen hammer head 50 illustrated in FIG. 9. These may be stored and conveniently carried in a receptacle 60 such as that illustrated in FIG. 10, along with any other heads desired by the owner.

An owner simply selects the desired head needed for a particular job and screws it onto the shank 16 until the cross hole 24 formed through the boss in the head 18 is in alignment with the cross hole 28 formed through the shank. The pin 28 is thereupon inserted through the aligned cross holes until the head 36 seats against the flattened surface 34 formed at the periphery of the boss. The collar 30 is then threaded upwardly until it seats against the boss 31 and then the locking nut 38 is jammed against the collar 30.

In order to replace the head with a different head the above described procedure is simply reversed to remove the first head and then repeated to attach the second.

Various modifications may be made with the structures illustrated in the drawings within the spirit of the present invention. For example, in addition to the ball peen, claw and hatchet heads which are illustrated, other hammer heads may be used. For example, a mallet having a nonmarring surface may be made out of nylon or other synthetic resin material by bonding an internally threaded tube within a bore in the head and permitting the tube to extend slightly from the head to form the boss. Material may be saved by forming the handle grip portion 14 of a hollow material and additionally forming a portion of the shank 12 nearest the grip 14 with a hollow tube. The threaded portion of the shank 12 may be formed on a cylindrical threaded lug which extends into the hollow portion of the shank and is held there by a press or friction fit or other suitable connection.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. A universal hammer having a quick release, detachable handle and head portions to permit interchange of the head with another head, said hammer comprising:
    (a) at least one head having a bore formed as a part of a coupling means to receive a universal handle and having a cross hole formed transversely through said bore;
    (b) a universal handle having a shank formed as a mating coupling means to extend into and engage said bore to connect said head to said handle, said handle having a cross hole formed transversely through said shank and positioned in alignment with the cross hole of said head when the two are engaged;
    (c) a slideable pin extending through said cross holes, a cross sectional tolerance of said pin permitting low resistance insertion and removal of said pin through said cross holes; and
    (d) a collar removably attached around said cross holes to prevent withdrawal of said pin.

2. A hammer in accordance with claim 1 wherein said coupling means comprises screw threads, wherein female threads are formed in said head and male threads are formed at the end of said shank and wherein said collar is threadedly engaged to said shank.

3. A hammer in accordance with claim 2 wherein a lock nut is threadedly engaged to said shank to engage the side of the collar distally from the head.

4. A hammer in accordance with claim 3 wherein a circular boss is formed on said head at the end of and extending coaxially with said bore, wherein said cross hole extends through said boss and said collar includes an annular tube portion which matingly surrounds said boss.

5. A hammer in accordance with claim 4 wherein said boss has flattened surfaces on its periphery around each end of said cross holes and wherein the length of said pin, the outer diameter of said boss and the inner diameter of the annular tube portion of said collar are substantially equal.

6. A universal hammer kit having a quick release, detachable handle and head portions to permit interchange of the head portions with each other, said hammer kit comprising:
  (a) a plurality of differently styled heads each having a bore formed as a part of a coupling means to receive a universal handle and having a cross hole formed transversely through said bore;
  (b) a universal handle having a shank formed as a mating coupling means to extend into and engage said bore to connect one of said heads to said handle, said handle having a cross hole formed transversely through said shank and positioned in alignment with the cross hole of said head when the two are engaged;
  (c) a slideable pin extending through said cross holes of said bore of one of any said heads and said cross holes of said handle, a cross sectional tolerance of said pin permitting low resistance insertion and removal of said pin through said cross holes; and
  (d) a collar removably attached around said cross holes to prevent withdrawal of said pin.

* * * * *